May 30, 1967     M. R. BARROWS     3,322,147
FLUID PRESSURE ACTUATED TUBE COMPRESSOR VALVE
Filed April 15, 1964

INVENTOR
Martin R. Barrows
BY John R. Ewbank
ATTORNEY

1

3,322,147
FLUID PRESSURE ACTUATED TUBE COMPRESSOR VALVE
Martin R. Barrows, North Wales Road,
North Wales, Pa. 19454
Filed Apr. 15, 1964, Ser. No. 359,974
2 Claims. (Cl. 137—595)

This invention relates to valve systems and particularly to sphincter valves comprising a tube subjected to constriction.

Heretofore pinch clamps have been employed for constricting tubes which had sufficient resilience to return to normal shape subsequent to being pinched to a fully closed position. Heretofore various devices such as rubber bands have been employed to apply a radial force upon a circular tube to achieve a sphincter valve. However, resilient tube sphincter valves have not been as widely used industrially as competitive designs, partly because of the inadequacy of previous designs for applying a uniform pressure circumferentially about the tube.

In accordance with the present invention, a resilient tube is positioned within a pressure chamber and the pressure of the fluid around the tube is regulated to control the size of opening, if any, permitted in the tube. In certain embodiments of the invention, a plurality of lines are cut off simultaneously by the application of high pressure to a hydraulic fluid surrounding a plurality of resilient tubes, whereby each of the lines is closed by the sphincter valve action of the hydraulic fluid upon the tube in the pressure chamber. In an alternative embodiment, a hydraulic fluid containing magnetizable particles can be temporarily hardened by switching on an electro magnetic field, thereby locking the valve into a selected constriction.

Figure 1:
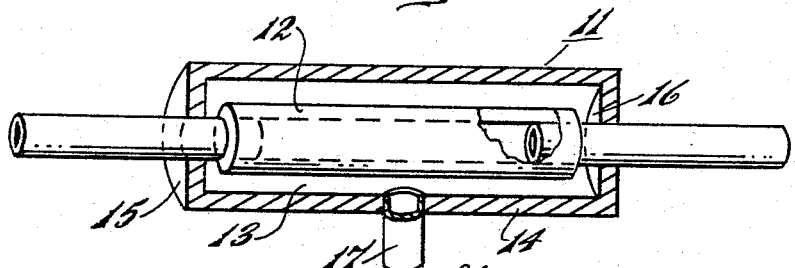
Figure 2:
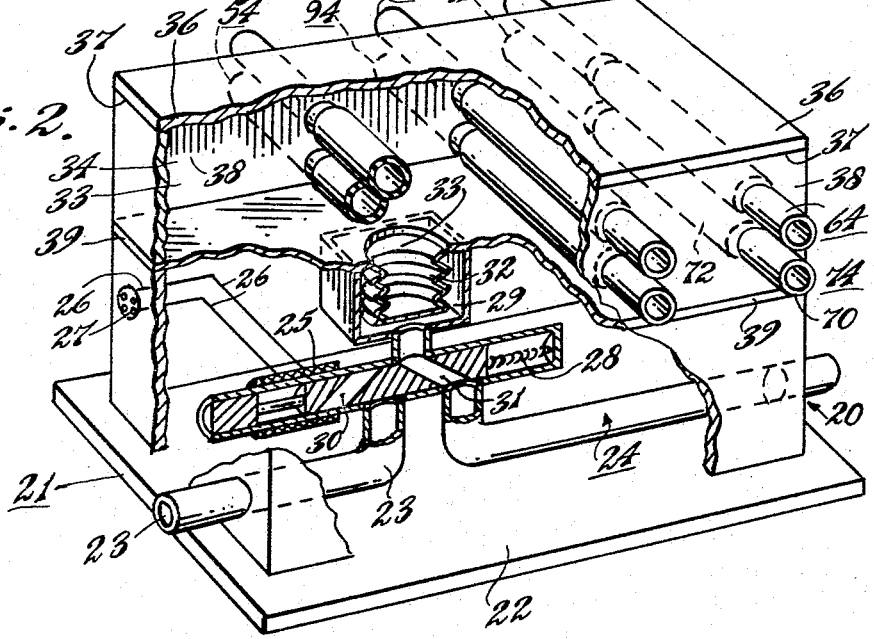
Figure 3:
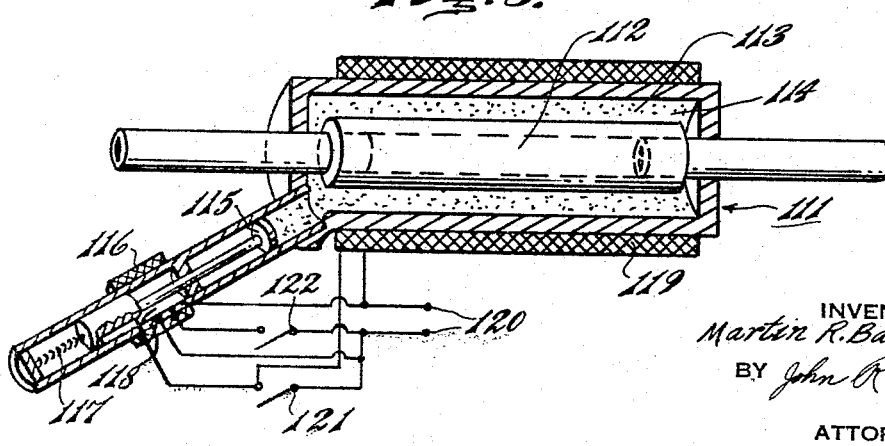

The nature of the invention is further clarified by reference to the accompanying drawings. In FIG. 1, a single sphincter valve having the surrounding pressure chamber is shown schematically. FIG. 2 is a schematically, partially cut-out view of gang valve featuring a plurality of resilient tubes immersed in a hydraulic liquid in a pressure chamber. FIG. 3 is a schematic view of an embodiment of the invention featuring a magnetically hardenable material.

Referring now in detail to the drawings, and to FIG. 1, a sphinter valve 11 comprises a resilient tube 12 which passes through a pressure chamber 13 defined in part by a cylindrical wall 14 and end walls 15 and 16. A fluid pressure supply line 17 directs compressed air into the pressure chamber 13 whenever the sphincter valve 11 is to be obstructed, and by the application of a high pressure, the sphincter valve 11 is completely closed to the normal flow of fluid thru the resilient tube 12. The resiliency of the tube 12 permits the tube to return to its normal cylindrical shape when the air pressure in the pressure chamber 13 is returned to ambient pressure. By the use of pressures between atmospheric pressure and that necessary for completely closing the valve 11, the combination can be employed for only partially restricting the flow through the tube 12.

By providing a flexible tube surrounded by a pressure chamber in the flow line in which the tube 12 is a component, certain important advantages are achieved. The flexible tube functions as a shock absorber to sudden changes in pressure in the line. The sudden closing of a poppet valve is a nearby portion of the system might stimulate a great surge of pressure tending to make a hammering noise, or tending even to rupture the rigid piping, but such tendencies are harmlessly overcome by the resiliency of the flexible tube 12, which can expand to a significant oversize to accommodate and dissipate the surge of pressure. Moreover, when the valve 11 is closed to the normal pressures in tube 12, it is only resiliently closed, and in the event of a momentary surge of excess pressure, might open to pass such excess pressure while still remaining closed to ordinary pressures. During the opening and closing of the resilient sphincter valve 12 having the fluid pressure chamber 13, no pressure surge is transmitted to adjacent portions of the piping system, thereby achieving a more quiet and a more predictable valve action than is characteristic of conventional valving. The flexible tubing 12 is not instantly damaged by the abrasives and debris flowing therethrough, thus distinguishing it from most metal to metal contacting valves. The fluid (either gaseous or liquid) pressure in the pressure chamber 13 can act to close the valve 12 even when debris is partially clogging the tube 12, and the intermittent opening and closing of the valve tends to provide a peristaltic pumping action for disengaging the debris from the zone of the sphincter action.

A reciprocating hydraulic motor is ordinarily controlled by a spool type valve which intermittently shifts the side of the piston subjected to the high pressure oil, whereby surge pressures develop in adjacent portions of the hydraulic piping system. By the use of four of the sphincter valves of the present invention for the control of the action of a reciprocating piston of a hydraulic motor, many of the problems of transient surge pressures in nearby portions of the hydraulic system are eliminated.

The concept of using a fluid pressure chamber for controlling a plurality of sphincter valves permits the attainment of a much simpler gang valve than has previously been generally employed. As shown in FIG. 2, a gang valve 21 comprises a base plate 22 and vertical walls. A compressed air supply line 23 directs compressed air to a three way valve 24 yieldingly urged one way or the other by a solenoid 25 or a spring 28. A cable 26 of wires connects the solenoid 25 with a socket 27, adapted to accommodate a plug supplying the gang valve 21 with electrical power and the signals instructing the valve to act. The three way valve 24 permits compressed air to enter an accumulating chamber 29 through port 30, or to leave through port 31. As the air pressure in the accumulating chamber 29 is built up to a high pressure, it is transmitted to a bellows 32 containing a hydraulic liquid 33, which is thus highly pressurized while still beng preserved in a completely degassed condition. The bellows 32 partakes of the nature of a resilient spring tending to restore to a fully expanded condition promptly after the compressed air is discharged from the accumulating chamber 29 through port 31.

Particular attention is directed to the fact that a pressure chamber 34 is filled with the hydraulic liquid 33, the pressure of which is increased by the compression of the bellows 32 and the presence of compressed air in the accumulating chamber 29. The pressure chamber 34 has a floor 39 with an opening communicating with the open top of the bellows 32, so that the liquid 33 in the pressure chamber 34 may be compressed by compressing the bellows 32. A removable lid 36 is secured to vertical walls 38. An intermediate gasket 37 prevents any leakage of gas or liquid from the pressure chamber 34. When the lid 36, gasket 37, and liquid 33 are removed, there is easy access to the pressure chamber 34.

Each of the hydraulically actuated sphincter valves in the gang valve has the advantage discussed in connection with the hydraulically actuated modification of FIG. 1, including such advantages as abrasion resistance, and the minimizing of surge pressure, transient pressures, noise, and the like. A detailed description of one of the gang of valves clarifies the construction of each and all. Although FIG. 2 schematically shows 6 members of the gang, this number is merely illustrative of a plurality, and more or less members are useful in appropriate situations. An inlet tube 70 extends from outside of the body 20, through the wall thereof, and into a portion of the pressure chamber 34, and is axially aligned with an exit tube 71 having an internal portion within the pressure chamber, an external portion extending from the body, and in intermediate portion passing through a vertical wall 38 of the body. A flexible tube 72 is anchored securely onto the internal portions of the inlet and exit tubes 70 and 71. Under normal condition, fluid may pass through the inlet tube 70, flexible tube 72, and exit tube 71 without obstruction, but the combination is a sphincter valve 74 because it is immersed in the liquid of the hydraulic pressure chamber 34. When the compressed air and electrical actuation of the solenoids establish a high pressure in the hydraulic liquid 33 in the pressure chamber 34, the flexible tube 42 is squeezed to obstruct either partially or completely the flow-through the tube. Ordinarily the pressure of the fluids flowing in each of the lines is substantially the same, and the pressure of the hydraulic fluid applied to cut off such lines is many times such line pressure, and under these circumstances, the action of the hydraulic fluid in closing all the sphincter valves in the gang valve is substantially simultaneous. Thus, the shifting of the hydraulic fluid to high pressure closes not only valve 44, but also valves 54, 64, 74, 84, and 94, each having a construction and a method of operation as described in connection with the valve 44.

As shown in FIG. 3, a flexible tube 112 of a valve 111 is positioned in a pressure chamber 113 containing a magnetically susceptible hydraulic liquid 114 containing a plurality of particles of magnetically susceptible iron alloy. A piston 115 can advance to impart high hydraulic pressure to the dispersion of iron particles in a liquid and to thus close the flexible tube 112. The piston 115 can be advanced or retarded by a solenoid 116 and spring 117 respectively. When the solenoid 116 is energized by actuation of switch 122, the piston advances, and upon reaching the fully advanced position in which the flexible tube 112 should be completely closed, a switch 118 is closed, whereby an electromagnet 119 is energized by a power source 120. The magnetic field of the electromagnet 119 transforms the pressurized liquid 114 into a relatively rigid material, whereby the flexible tube 112 remains closed notwithstanding back pressure of significant magnitude. A switch 121, electrically connected in parallel to switch 118, can be manually actuated to permit the similar locking of the valve 111 at a position other than completely closed.

Various modifications of of the invention may be made without departing from the scope of the invention as set forth in the appended claims.

The invention claimed is:
1. A valve consisting essentially of: a body; a pressure chamber in the body; a magnetically hardenable hydraulic liquid in the pressure chamber; at least one flexible tube immersed in the hydraulic liquid, each tube having the resiliency to return to normal dimensions after being squeezed; means for making selected increases and selected decreases in the pressure of the hydraulic liquid, whereby each flexible tube may be squeezed in sphincter valve action to constrict the flow through a flexible tube and whereby such squeezing may be released; an electromagnet positioned to impart a magnetic field to the magnetically hardenable hydraulic liquid; and switching means for the electromagnet.

2. A gang valve for use in systems providing electrical power and compressed air, said gang valve comprising the combination of: a body; a hydraulic pressure chamber containing degassed hydraulic liquid, the pressure in the chamber being responsive to the compression of a bellows containing said liquid, said chamber having high pressure during the contraction of the bellows, and having low pressure after the resilient expansion of the bellows; a compressed air supply connection; a compressed air discharge port; an accumulating chamber exerting pressure upon the bellows whereby the bellows are contracted when the accumulating chamber is filled with compressed air and whereby the bellows expand upon the flow of compressed air through the discharge port; valve means connecting the accumulating chamber with either the compressed air supply connection or the discharge port; electrical means actuating the valve means; a plurality of flow lines to be regulated by the gang valve, each flow line comprising an inlet adjacent the body, an outlet adjacent the body, and a flexible tube immersed in the hydraulic fluid, said flexible tube having a resiliency restoring the flexible tube to its normal dimensions subsequent to the removal of squeezing pressure, whereby the flow through each line is regulated by the air pressure in the accumulating chamber.

References Cited

UNITED STATES PATENTS

| 2,390,534 | 12/1945 | Heuver | 137—608 X |
| 2,667,237 | 1/1954 | Rabinow. | |
| 2,735,642 | 2/1956 | Norman | 251—5 |
| 2,820,471 | 1/1958 | Crowell | 137—251 |
| 2,915,078 | 12/1959 | Ochs | 251—5 X |
| 3,039,733 | 6/1962 | Mattioli | 251—5 |

M. CARY NELSON, *Primary Examiner.*

H. T. KLINKSIEK, *Assistant Examiner.*